US012640473B2

(12) United States Patent
Seo

(10) Patent No.: US 12,640,473 B2
(45) Date of Patent: May 26, 2026

(54) FREQUENCY STEERED PHASED ARRAY ANTENNA

(71) Applicant: KOREA INSTITUTE OF FUSION ENERGY, Daejeon (KR)

(72) Inventor: Seong Heon Seo, Daejeon (KR)

(73) Assignee: KOREA INSTITUTE OF FUSION ENERGY, Daejeon (KR)

( * ) Notice: Subject to any disclaimer, the term of this patent is extended or adjusted under 35 U.S.C. 154(b) by 218 days.

(21) Appl. No.: 18/727,824

(22) PCT Filed: Feb. 3, 2023

(86) PCT No.: PCT/KR2023/001581
§ 371 (c)(1),
(2) Date: Jul. 10, 2024

(87) PCT Pub. No.: WO2023/153724
PCT Pub. Date: Aug. 17, 2023

(65) Prior Publication Data

US 2025/0096462 A1 Mar. 20, 2025

(30) Foreign Application Priority Data

Feb. 9, 2022 (KR) ........................ 10-2022-0016995

(51) Int. Cl.
*H01Q 3/42* (2006.01)

(52) U.S. Cl.
CPC .................................... *H01Q 3/42* (2013.01)

(58) Field of Classification Search
CPC ........................................................ H01Q 3/42
(Continued)

(56) References Cited

U.S. PATENT DOCUMENTS 10,811,782 B2 * 10/2020 Quarfoth ................ H01Q 3/443
11,569,575 B2 * 1/2023 Klemmer ............. H04B 7/0617
(Continued)

FOREIGN PATENT DOCUMENTS

CN 105655720 A * 6/2016 ............. H01Q 23/00
CN 107634335 A * 1/2018
(Continued)

OTHER PUBLICATIONS

International Search Report and Written Opinion issued in Corresponding PCT Application No. PCT/KR2023/001581, dated May 9, 2023 (English Translation provided).

*Primary Examiner* — Harry K Liu
(74) *Attorney, Agent, or Firm* — NORTON ROSE FULBRIGHT US LLP

(57) ABSTRACT

The present invention relates to a frequency steered phased array antenna which adjusts beam radiation angle according to frequency for broadband electromagnetic waves, and radiates beams of uniform intensity over a broad range of angles including directly forward. The frequency steered phased array antenna according to the present invention comprises: a directional coupler including a serial feed line that is stacked in n layers and has a plurality of coupling holes formed in one direction in each of the layers; and a radiating module including n horn antennas respectively connected in correspondence to the n layers of the serial feed line, wherein the plurality of coupling holes are formed in each of the layers of the serial feed line at intervals of ¼ of the wavelength (λ) of electromagnetic waves (radio waves) supplied to the serial feed line, and the horn antennas radiate the electromagnetic waves output through the coupling holes of the serial feed line.

9 Claims, 4 Drawing Sheets

(58) Field of Classification Search
USPC .......................................................... 342/372
See application file for complete search history.

(56) References Cited

U.S. PATENT DOCUMENTS

| | | | | |
|---|---|---|---|---|
| 12,111,384 | B2 * | 10/2024 | Vollbracht ................ | G01S 7/35 |
| 2004/0183616 | A1 | 9/2004 | McCandles et al. | |
| 2005/0146479 | A1 | 7/2005 | Stenger et al. | |
| 2019/0324134 | A1 * | 10/2019 | Cattle ..................... | G01S 7/024 |
| 2020/0358182 | A1 * | 11/2020 | Klemmer ................. | H01Q 3/26 |

FOREIGN PATENT DOCUMENTS

| | | | | | |
|---|---|---|---|---|---|
| CN | 207677093 | U | * | 7/2018 | |
| CN | 113363696 | A | * | 9/2021 | ............. H01Q 25/04 |
| CN | 215342965 | U | * | 12/2021 | |
| CN | 120532966 | A | * | 8/2025 | ............. B21D 22/02 |
| CN | 121428558 | A | * | 1/2026 | |
| EP | 3764463 | A1 | * | 1/2021 | ............... H04B 1/40 |
| KR | 20050036595 | | | 4/2005 | |
| KR | 101507203 | | | 3/2015 | |
| KR | 20200007214 | | | 1/2020 | |
| KR | 20200086755 | | | 7/2020 | |
| KR | 20260008573 | A | * | 1/2026 | ............. G21B 1/057 |
| WO | WO-2018115895 | A2 | * | 6/2018 | ......... H01Q 21/0025 |

* cited by examiner

FREQUENCY STEERED PHASED ARRAY ANTENNA

CROSS-REFERENCE TO RELATED APPLICATIONS

The present application is a national phase application under 35 U.S.C. § 371 of International Application No. PCT/KR2023/001581 filed Feb. 3, 2023, which claims the benefit of priority to Korean Patent Application No. 10-2022-0016995, filed Feb. 9, 2022. The entire contents of each of the referenced patent applications are incorporated into the present application by reference.

BACKGROUND

Field of the Invention

The present disclosure relates to a frequency steered phased array antenna. More specifically, the present disclosure relates to a phased antenna that adjusts a beam radiation angle based on a frequency, and emits electromagnetic waves in a broadband band at a uniform beam intensity and in a wide angular area including a direction perpendicular to a front surface of the antenna.

Description of Related Art

An antenna is an RF device that propagates electromagnetic waves through a free space, and may transmit and receive electromagnetic waves in a focused manner in a specific direction. A phased array antenna is an antenna in which multiple antennas are arranged in an array so as to combine radiating beams with each other to increase the directivity and gain of the beam. The phased array antenna may transmit a signal in a desired direction through beam forming, thereby increasing the gain of the antenna.

The phased array antennas may be classified into active phased array antennas and passive phased array antennas. The active phased array antenna transmits and receives a frequency signal received through multiple semiconductor transmit/receive modules (TRM) and phasers through a multiple array antenna. The active phased array antenna may adjust the beam forming shape and beam forming direction by adjusting the signal magnitude of each of the multiple TRM modules and the phase of the frequency signal transmitted through each antenna. The passive phased array antenna is connected to one transceiver, and transmits and receives the frequency signal received through one transceiver through a multiple array antenna. A frequency steered phased array antenna is of a type of the passive phased array antenna in which the radiation direction (boresight) is adjusted based on the frequency.

However, in most of the passive phased array antennas, a scattering coefficient (S11) in a direction perpendicular to a front surface of the antenna is close to 0 dB, thus making it difficult for the beam to radiate in a direction perpendicular to a front surface of the antenna. Further, the intensity of the beam is uneven in a radiation angle area including in a direction perpendicular to a front surface of the antenna, and the beam is only radiated obliquely relative to the direction perpendicular to a front surface of the antenna.

SUMMARY OF THE INVENTION

The present disclosure provides a frequency steered phased antenna that adjusts a beam radiation angle based on a frequency, and emits electromagnetic waves in a broadband band at a uniform beam intensity and in a wide angular area including a direction perpendicular to a front surface of the antenna.

The present disclosure provides a frequency steered phased antenna that may be applied to a doppler reflectometer which may measure density fluctuations of plasma inside a plasma chamber.

A frequency steered phased array antenna according to the present disclosure includes a directional coupler including a serial feed line, wherein the serial feed line includes a stack of n layers, wherein a plurality of coupling holes are formed in each of the layers and are arranged in one direction; and a radiating module including n horn antennas respectively connected to the n layers of the serial feed line, wherein the plurality of coupling holes formed in each of the layers of the serial feed line are arranged so as be spaced from each other by a spacing of ¼λ, wherein λ refers to a wavelength λ of an electromagnetic wave supplied to the serial feed line, wherein the horn antennas radiate the electromagnetic wave output through the coupling holes of the serial feed line.

In one embodiment, the serial feed line includes a rectangular waveguide including a stack of n layers having a round track shape.

In one embodiment, each of the layer having the round track shape includes a first curved portion, a straight portion, an upward curved portion, and a second curved portion, wherein the first upward curved portion of each layer is connected to a first curved portion of a higher layer.

In one embodiment, the coupling holes of each of the layers are defined in one side surface of the straight portion and are spaced from each other by the spacing of ¼λ.

In one embodiment, a number n of the layers corresponds to a number of channels of the antenna.

In one embodiment, a number and a size of the coupling holes in each of the layers are determined based on an output of the electromagnetic wave output through the radiating module.

In one embodiment, sizes of the coupling holes in the layers of the serial feed line are distributed such that the size of the hole becomes smaller as a level of the layer changes from a center layer to each of top and bottom layers, such that the output of the electromagnetic wave output through the radiating module is distributed in a Gaussian shape in a vertical direction.

In one embodiment, each of the horn antennas includes a waveguide section and a horn section, wherein the waveguide section is a rectangular waveguide.

In one embodiment, a side surface of the waveguide section is connected to the directional coupler, wherein the electromagnetic wave output through the coupling holes of the directional coupler is output to the side surface of the waveguide section.

As described above, the frequency steered phased array antenna according to the present disclosure may adjust a beam radiation angle based on a frequency, and may emit electromagnetic waves in a broadband band at a uniform beam intensity and in a wide angular area including a direction perpendicular to a front surface of the antenna.

The frequency steered phased array antenna according to the present disclosure may be applied to a doppler reflectometer to measure the density fluctuations of the plasma inside the plasma chamber.

DETAILED DESCRIPTION OF THE INVENTION

Hereinafter, the specific details for implementing the frequency steered phased array antenna according to the present disclosure will be set forth.

Figure 1:
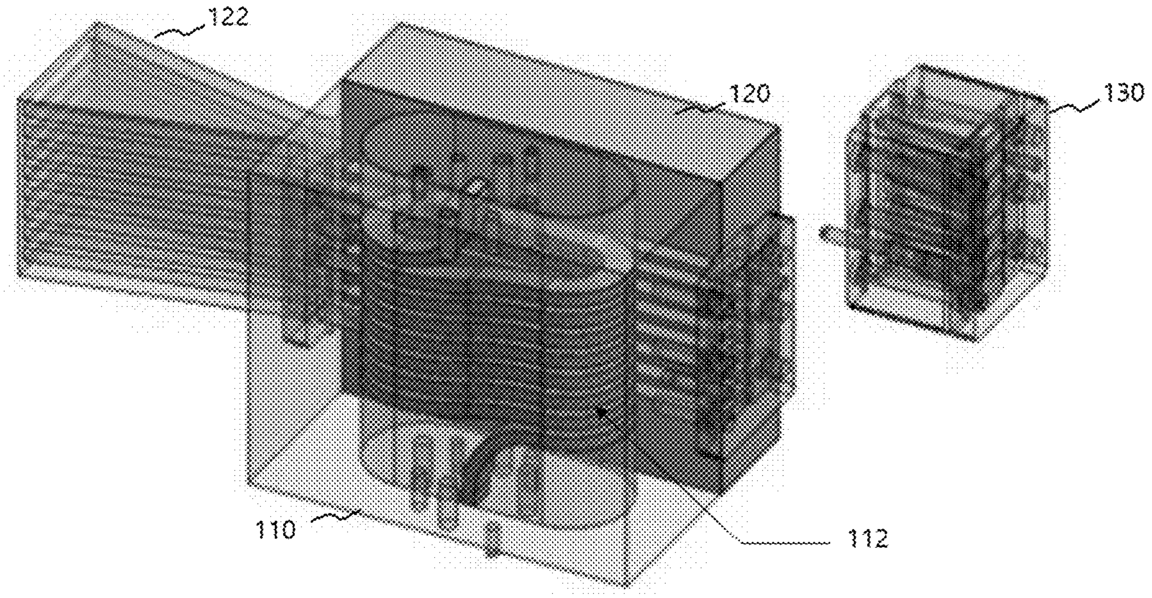
FIG. 1 is a perspective view of a frequency steered phased array antenna according to an embodiment of the present disclosure.
Figure 2:
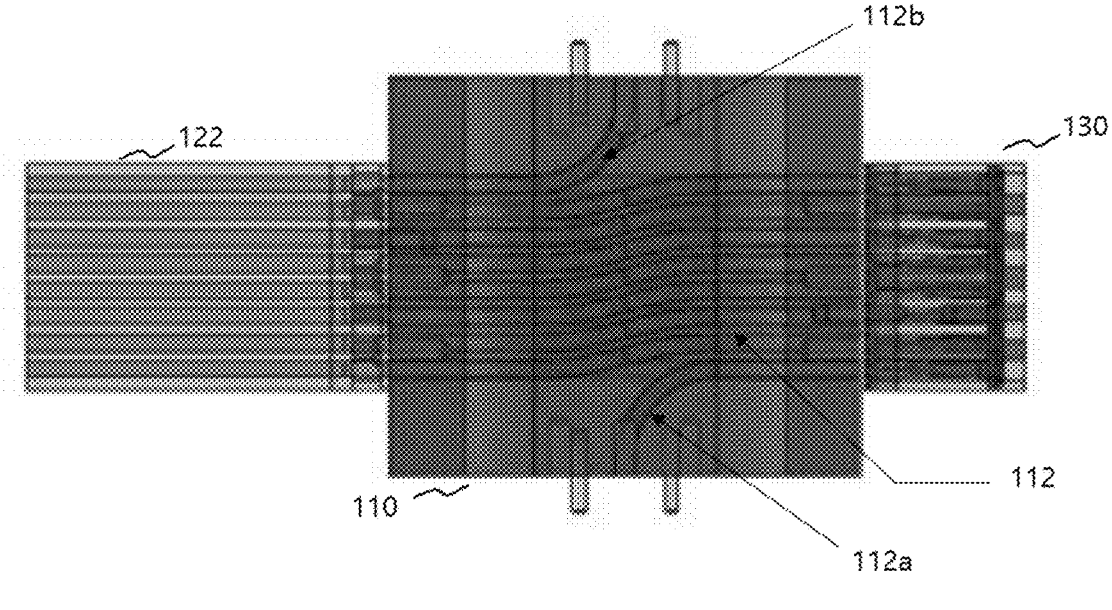
FIG. 2 is a side view of the frequency steered phased array antenna in FIG. 1.
Figure 3:
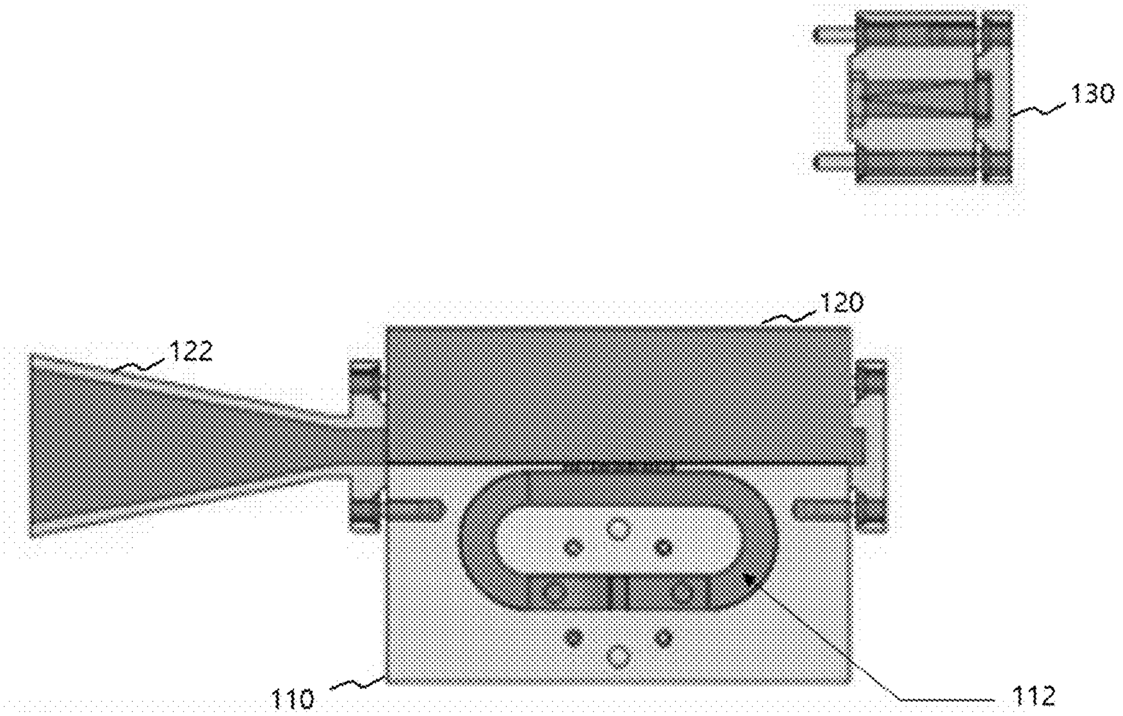
FIG. 3 is a plan view of the frequency steered phased array antenna in FIG. 1.

FIG. 1 is a perspective view of a frequency steered phased array antenna according to an embodiment of the present disclosure, FIG. 2 is a side view of the frequency steered phased array antenna, and FIG. 3 is a plan view of the frequency steered phased array antenna.

Referring to FIGS. 1 to 3, the frequency steered phased array antenna includes a directional coupler 110, a radiating module 120), and a terminator 130. The directional coupler 110 includes a serial feed line 112, and the radiating module 120 includes a horn antenna 122.

The directional coupler 110 receives an electromagnetic wave (radio wave) signal of a preset frequency through one end of the serial feed line 112 and outputs the received signal to the other end thereof. The radiating module 120 is connected to the directional coupler 110. The electromagnetic wave output to the radiating module 120 through a coupling hole of the serial feed line 112 propagates to the outside through the horn antenna 122.

The directional coupler 110 includes the serial feed line 112 including a stack of n layers (n is a natural number). A plurality of coupling holes are formed in each layer and are arranged in in one direction. In each layer of the serial feed line 112, the plurality of coupling holes may be arranged so as to be spaced from each other by a spacing of ¼λ, wherein λ refers to a wavelength (λ) of the electromagnetic wave supplied to the serial feed line 112. The serial feed line 112 may be embodied as a rectangular waveguide including the stack of the n layers in a round track shape.

One end 112*a* connected to a bottom layer of the serial feed line 112 may extend vertically and downwardly, and the other end 112*b* connected to a top layer of the serial feed line 112 may extend vertically upwardly.

The radiating module 120 includes n horn antennas 122 respectively connected to the n layers of the serial feed line 112. Each horn antenna 122 radiates electromagnetic waves output through the coupling holes of the serial feed line 112 to the outside. In one embodiment, each horn antenna 122 may correspond to an H-plane sectoral horn antenna.

In one embodiment, the number n of layers may correspond to the number of channels of the antenna. For example, an 8-channel frequency steered phased array antenna may include the serial feed line composed of 8 layers and corresponding 8 horn antennas. A 32-channel frequency steered phased array antenna may include the serial feed line composed of 32 layers, and corresponding 32 horn antennas.

The terminator 130 is a component of the directional coupler 110 and suppresses reflection of the electromagnetic waves output in the opposite direction to the antenna among electromagnetic waves output through the coupling holes of the feed line 112. For example, the terminator 130 may include a 50 ohm terminator.

Figure 4:
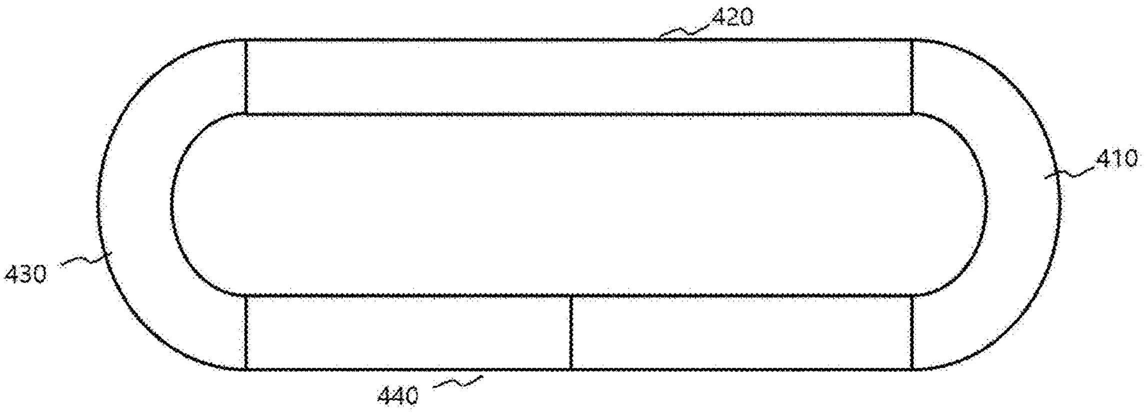
FIG. 4 is a plan view of each of layers of a serial feed line of the frequency steered phased array antenna in FIG. 1.

FIG. 4 is a diagram showing a plan view of each layer of the serial feed line of the frequency steered phased array antenna in FIG. 1.

Referring to FIG. 4, each round track-shaped layer includes a first curved portion 410, a straight portion 420, an upward curved portion 440, and a second curved portion 430. The first upward curved portion 440 of each layer is connected to the first curved portion of a higher layer so that the stack of the layers may constitute one connected wave-guide path. In the straight portion of each layer, the plurality of coupling holes may be formed in one surface thereof and arranged so as to be spaced from each other by the spacings of ¼ wavelength (λ).

In one embodiment, a length of the round track of each layer of the serial feed line 112 may be determined based on a difference between phases of the electromagnetic waves to be output through the horn antennas 122 of the radiating module 120. For example, when the electromagnetic waves pass through a (n-4)-th layer of the serial feed line 112 and then to a (n-5)-th layer thereof, there is a difference equal to a length of one round track between a travel length of the electromagnetic waves output through the coupling holes of the (n-4)-th layer and a travel length of the electromagnetic waves output through the coupling holes of the (n-5)-th layer. Therefore, the phase difference equal to the travel length difference occurs between the electromagnetic waves output from the horn antenna corresponding to the (n-4)-th layer and the horn antenna corresponding to the (n-5)-th layer.

Figure 5:
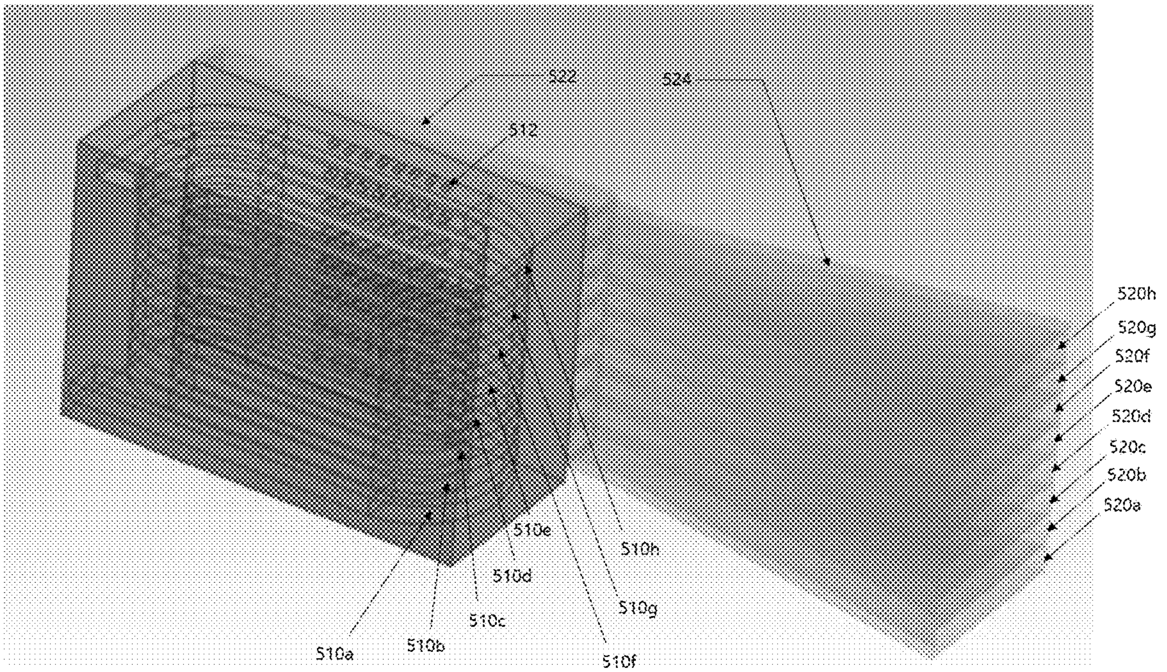
FIG. 5 is a diagram showing a serial feed line and a horn antenna of the frequency steered phased array antenna in FIG. 1.

FIG. 5 is a diagram showing the serial feed line and the horn antenna of the frequency steered phased array antenna.

FIG. 5 is a diagram showing the serial feed line and the horn antenna of an 8-channel frequency steered phased array antenna. Hereinafter, for convenience of description, the 8-channel frequency steered phased array antenna will be used by way of example.

Referring to FIG. 5, the serial feed line is composed of eight layers 510*a*, 510*b*, 510*c*, 510*d*, 510*e*, 510*f*, 510*g*, and 510*h*. The eight layers may be connected to 8 horn antennas (520*a*, 520*b*, 520*c*, 520*d*, 520*e*, 520*f*, 520*g*, and 520*h*, respectively.

The serial feed line may have the plurality of coupling holes formed in each of the eight layers 510*a*, 510*b*, 510*c*, 510*d*, 510*e*, 510*f*, 510*g*, and 510*h*. In one embodiment, the plurality of coupling holes may be formed in the straight portion of each layer. The coupling holes in each layer may be spaced from each other by the spacing of ¼λ, wherein λ refers to the wavelength of the electromagnetic wave supplied to the serial feed line. When the coupling holes are spaced from each other by the spacing of ¼λ, the round trip distance between adjacent coupling holes is ½λ, so that destructive interference occurs between reflected waves respectively reflected from the coupling holes. Therefore, the reflected waves respectively reflected from the coupling holes of each layer of the serial feed line mutually interfere with each other in the destructive manner, thereby reducing the intensity of the reflected waves. The larger the number of coupling holes, the greater the destructive interference effect of reflected waves on electromagnetic waves in a broadband band.

The coupling holes formed in each of the layers 510*a*, 510*b*, 510*c*, 510*d*, 510*e*, 510*f*, 510*g*, and 510*h* of the serial feed line transmit a portion of the output of the electromagnetic waves passing through that layer to the horn antenna. In one embodiment, the number and the size of the coupling holes in each layer may be determined based on the output of electromagnetic waves output through the radiating module. For example, as the number of coupling holes defined in the corresponding layer increases or the size of the coupling holes defined in the corresponding layer increases, the output of the electromagnetic waves from the horn antenna corresponding to the corresponding layer may increase. A designer may determine the output of the electromagnetic waves to be output from the horn antenna corresponding to each layer, and set the number and the size of the coupling holes based on the determined output.

In one embodiment, sizes of the coupling holes in the layers of the serial feed line may be distributed such that the size of the hole becomes smaller as a level of the layer changes from the center layer to each of the top and bottom layers, such that the output of the electromagnetic waves output through the radiating module is distributed in a Gaussian shape in the vertical direction. For example, the same number of coupling holes may be formed in the layers of the serial feed line, while the sizes of the coupling holes in the layers of the serial feed line may be distributed such that the size of the hole becomes smaller as a level of the layer changes from the center layer to each of the top and bottom layers, such that the output of the electromagnetic waves output through the radiating module is distributed in a Gaussian shape in the vertical direction. The designer may determine the output and shape of the electromagnetic wave to be output through the radiating module, and set the number and size of the coupling holes based on the output and shape.

The horn antennas 520*a*, 520*b*, 520*c*, 520*d*, 520*e*, 520*f*, 520*g*, and 520*h* may be connected to the layers of the serial feed line, respectively. Each horn antenna includes a waveguide section 522 and a horn section 524, and the waveguide section 522 may correspond to a rectangular waveguide.

A length of the waveguide section 522 of each horn antenna may be designed based on the length of the straight portion of each layer of the serial feed line. For example, the length of the waveguide section 522 of each horn antenna may be designed to be larger than the length of the straight portion of each layer of the serial feed line.

One side surface of the waveguide section 522 is connected to a directional coupler, and the electromagnetic wave output through the coupling hole of the directional coupler is output to the side surface of the waveguide section 522. The electromagnetic wave output to the side surface of the waveguide section 522 is reflected in the waveguide section 522, and travels in the longitudinal direction of the waveguide section 522, and is radiated to the outside through the horn section 524.

Figure 6:
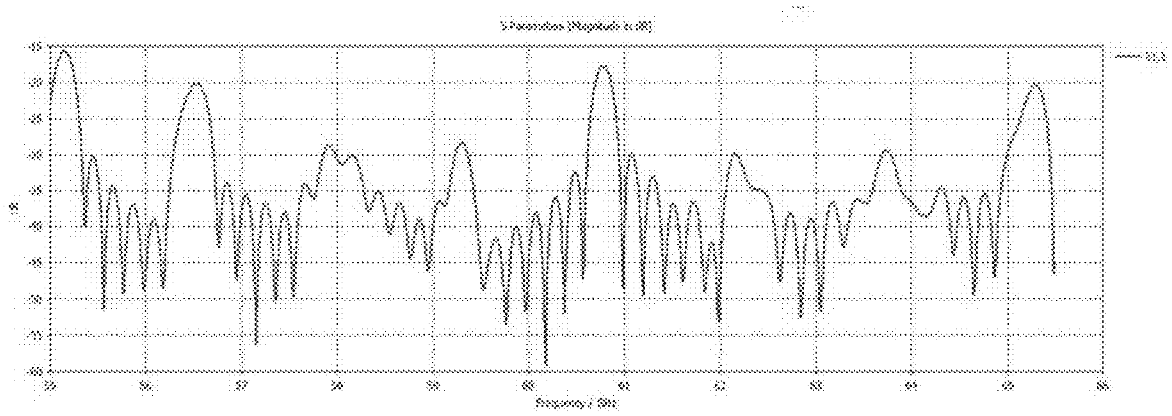
FIG. 6 is a diagram showing a scattering coefficient (S11) based on a frequency of the frequency steered phased array antenna in FIG. 1.
Figure 7:
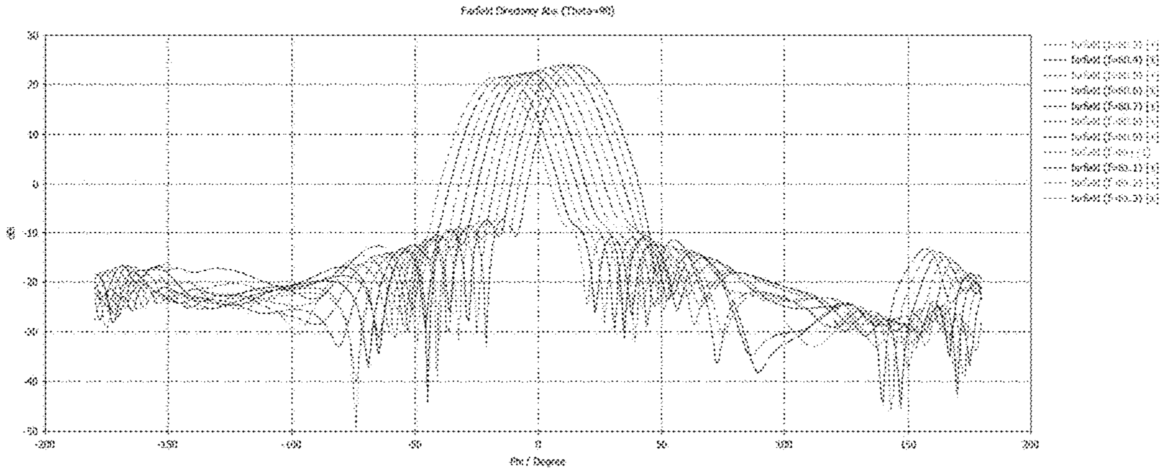
FIG. 7 shows a gain based on a radiation angle at various frequencies of the frequency steered phased array antenna in FIG. 1.

FIG. 6 is a diagram showing the scattering coefficient (S11) based on the frequency of the frequency steered phased array antenna in FIG. 1, and FIG. 7 is a diagram showing a gain based on a radiation angle of the frequency steered phased array antenna in FIG. 1 at various frequencies.

FIG. 6 is a diagram showing the scattering coefficient (S11) based on the frequency when the electromagnetic waves with a frequency in a range of 50 to 75 Ghz band (V-band) are input to the frequency steered phased array antenna in FIG. 1. Referring to FIG. 6, it may be identified that the scattering coefficient value is equal or lower than −15 dB in an entire frequency region of 50 to 75 Ghz band (V-band), and the scattering coefficient value is equal or lower than −25 dB in a significant portion of the frequency region.

FIG. 7 is a diagram showing the measured gain based on the radiation angle relative to the direction (0°) perpendicular to the front surface of the frequency steered phased antenna in FIG. 1 at various frequencies. Referring to FIG. 7, it may be identified that the maximum gains corresponding to the radiation directions including the direction (0°) perpendicular to the front surface are maintained at a similar value for all frequencies. In other words, it may be identified that the beam of the frequency steered phased antenna in FIG. 1 radiates well in the direction perpendicular to the front surface thereof.

The frequency steered phased array antenna in FIG. 1 may be applied to a doppler reflectometer to measure the density of plasma inside a plasma chamber. The doppler reflectometer is a non-contact measuring device that may measure density fluctuations and rotation profiles of plasma in the plasma chamber. To this end, a steerable beam of a defined spot-size and multiple frequencies to detect plasma areas with different densities are required. The frequency steered phased array antenna in FIG. 1 may be installed at a front end of the doppler reflectometer to measure the density fluctuations in plasma.

Although the present disclosure has been described based on the embodiment of the present disclosure, the technical idea of the present disclosure is not limited to the above embodiment. Various frequency steered phased array antennas may be implemented without departing from the technical idea of the present disclosure.

REFERENCE NUMERALS

110: Directional coupler
112: Serial feed line
110: Radiating module
122: Horn antenna
130: Terminator

What is claimed is:

1. A frequency steered phased array antenna comprising:
a directional coupler including a serial feed line, wherein the serial feed line includes a stack of n layers, wherein a plurality of coupling holes are formed in each of the layers and are arranged in one direction; and
a radiating module including n horn antennas respectively connected to the n layers of the serial feed line,
wherein the plurality of coupling holes formed in each of the layers of the serial feed line are arranged so as be spaced from each other by a spacing of ¼λ, wherein λ refers to a wavelength λ of an electromagnetic wave supplied to the serial feed line,
wherein the horn antennas radiate the electromagnetic wave output through the coupling holes of the serial feed line.

2. The frequency steered phased array antenna of claim 1, wherein the serial feed line includes a rectangular waveguide including a stack of n layers having a round track shape.

3. The frequency steered phased array antenna of claim 2, wherein each of the layer having the round track shape includes a first curved portion, a straight portion, an upward curved portion, and a second curved portion, wherein the first upward curved portion of each layer is connected to a first curved portion of a higher layer.

4. The frequency steered phased array antenna of claim 3, wherein the coupling holes of each of the layers are defined in one side surface of the straight portion and are spaced from each other by the spacing of ¼λ.

5. The frequency steered phased array antenna of claim 2, wherein a number n of the layers corresponds to a number of channels of the antenna.

6. The frequency steered phased array antenna of claim 1, wherein a number and a size of the coupling holes in each of the layers are determined based on an output of the electromagnetic wave output through the radiating module.

7. The frequency steered phased array antenna of claim 1, wherein sizes of the coupling holes in the layers of the serial feed line are distributed such that the size of the hole becomes smaller as a level of the layer changes from a center layer to each of top and bottom layers, such that the output of the electromagnetic wave output through the radiating module is distributed in a Gaussian shape in a vertical direction.

8. The frequency steered phased array antenna of claim 1, wherein each of the horn antennas includes a waveguide section and a horn section, wherein the waveguide section is a rectangular waveguide.

9. The frequency steered phased array antenna of claim 8, wherein a side surface of the waveguide section is connected to the directional coupler, wherein the electromagnetic wave output through the coupling holes of the directional coupler is output to the side surface of the waveguide section.

* * * * *